(No Model.)

C. F. STILLMAN.
Trotting Sulky.

No. 237,924. Patented Feb. 15, 1881.

WITNESSES:
Chas. M. Higgins.
Leicester Allen.

INVENTOR:
Charles F. Stillman
by S. W. Walrath
Atty.

UNITED STATES PATENT OFFICE.

CHARLES F. STILLMAN, OF PLAINFIELD, NEW JERSEY.

TROTTING-SULKY.

SPECIFICATION forming part of Letters Patent No. 237,924, dated February 15, 1881.

Application filed December 2, 1880. (No model.)

*To all whom it may concern:*

Be it known that I, CHARLES F. STILLMAN, of Plainfield, Union county, New Jersey, have invented certain new and useful Improvements in Trotting-Sulkies, of which the following is a specification.

My improvements aim to so construct the frame, axle, and shafts of the sulky as to allow more room for the hinder part of the horse, and to enable him to be hitched much closer to the work or to the axis of the wheels than has been heretofore possible, whereby interference with his gait shall be avoided and greater ease of draft and speed obtained.

My improvements also embody a means for adjusting the shafts to the sides of the horse to adapt the same to the animal.

To these ends the main features of my invention consist in constructing the sulky with its main frame or axle-tree curved or bowed backward from the axial line of the wheels, and in having the whiffletree attached to the middle of said frame at a point well back of the axis of the wheels, whereby room is provided for the hinder part of the horse back of the axial line, enabling him to be hitched closer to the load and within a shorter length than has been heretofore effected, and at the same time allow full freedom to the gait of the horse.

Another feature of my invention consists in curving the back ends of the shafts concentric with the center of the seat, or thereabout, and making them adjustable on the frame, which is similarly curved, whereby the spread of the shafts may be increased or decreased to better suit the size of the horse, and for other purposes, as hereinafter fully set forth.

Figure 1:
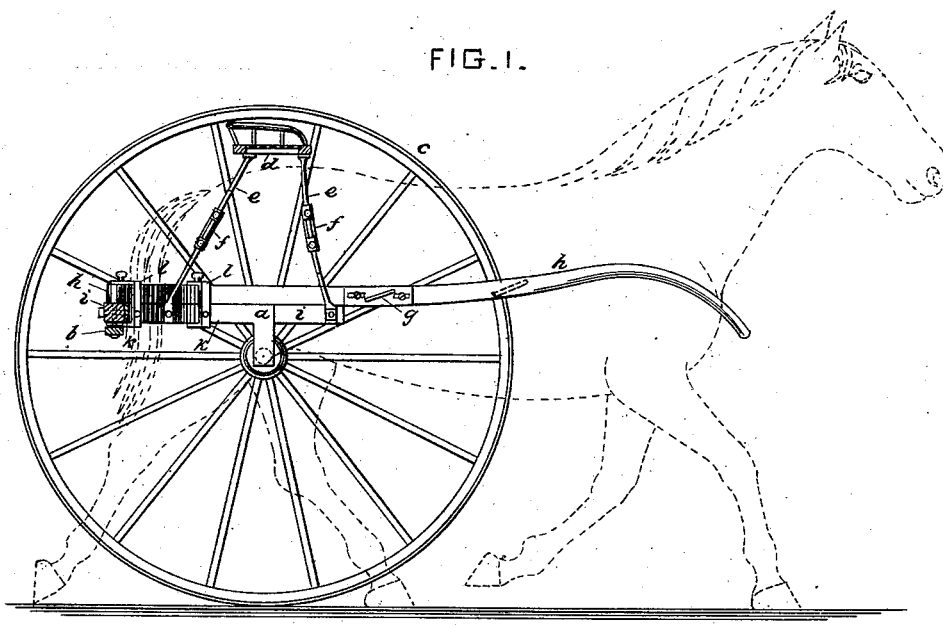
Figure 2:
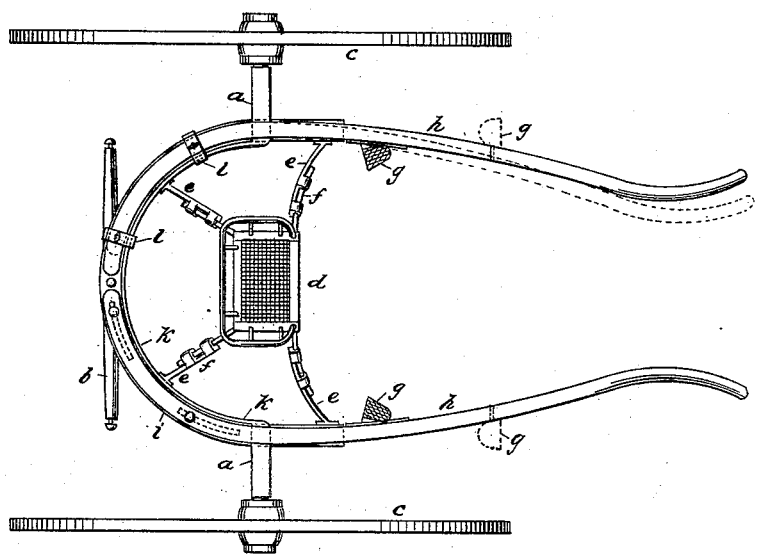

Figure 1 of the annexed drawings is a longitudinal central section and elevation of my improved sulky, showing by dotted lines the relative position of the horse when harnessed and in action. Fig. 2 is a plan of the sulky.

The sulky is constructed, as usual, with large wheels set far apart on their axle. In my invention, however, the middle of the axle-tree *a* or main frame of the sulky is curved or bowed in a horizontal plane back of the axial line, in a semicircular curve, or nearly so, leaving a free space between the wheels amply large to admit a horse and allow the free motion of his hind legs.

The whiffletree *b* is pivoted, as shown, at a point well back of the axis of the wheels, to the middle of the curved part of the frame or axle-tree; and it will be observed that by this construction the horse may be harnessed within such a short length, or so close to the load, that the hinder part of the horse will be back of the axial line of the wheels *c*, as shown by dotted lines in Fig. 1. This is conducive to easy draft and high speed, and enables the horse to turn short corners and to trot perfectly without danger of becoming thrown off his correct gait, being thus of prime advantage for trotting-horses.

The seat *d*, as will be observed, is situated centrally over the axial line, as usual, but is supported by inclined braces *e e*, which extend to the curved frame or axle-tree, and are provided with an extensible joint, *f*, to allow of the seat being raised or lowered to suit the height of the horse or other circumstances; and it will be seen that the construction is such that the seat comes directly over the rump of the horse, and hence the driver is brought nearer to the horse's head, which enables him to have the horse under easier and better control. Furthermore, this position of the horse relatively to the driver's seat has the advantage that it brings the horse's tail back of the driver, so that the switchings thereof do not disturb him, and, moreover, all excreta is deposited behind the seat and not before, as hitherto.

The feet of the driver are supported on the foot-rests *g g*, which project from the slotted base-plates which are fixed to the inner or outer sides of the shafts *h h*, as shown by full and dotted lines in Figs. 1 and 2, and are adjustable back or forth thereon to suit the position of the seat, the size of the driver, or other circumstances, as will be readily understood.

The axle *a* of the sulky may be made entirely of metal or partly of metal and wood, and its curved part, if of metal, is preferably made much thinner than its outer or straight ends, as shown. The straight ends are cranked downwardly, as illustrated, and receive the wheels in the usual manner. A semicircular frame-piece or arc, *i*, concentric with the curved part of the axle, is fixed thereto and extends forward at each end beyond the straight part of the axle for a slight distance, as shown fully in Figs. 1 and 2, and this arc, together with the axle, forms the main frame of the sulky. Now, the back ends of the shafts h h are curved concentric with the curved frame or arc i, which is an arc of a circle struck from the center of the seat, or thereabout, and the curved ends of the shafts overlie the frame and are held close and rigidly thereto by bolts k passing through the shafts and through slots in the frame, or by clamps l l, embracing both shafts and frame, as illustrated. It will now be observed that this curved form of the frame and shafts, with their described connections, admits of the shafts being adjusted on the frame and in a circular arc radiating from the seat, so that any warpings of the shafts may always be readily neutralized, and any desired spread be given to the outer ends of the shafts, as indicated by dotted lines in Fig. 2, to better suit the size of the horse, or to admit of a close or free adjustment of the shafts to or from the sides of the horse, as circumstances may require.

These several improved features, as may now be appreciated, combine to produce a sulky of novel and advantageous form, which particularly insures easy draft, rapid and safe turning, high speed, a perfect gait of the horse, and greatest ease and control to the driver.

I do not, of course, limit myself to the precise structure of the parts as illustrated in the drawings, as this may be varied; and it may be also observed that the several described features of my invention are not all confined to trotting-sulkies, but some of them may be employed in other vehicles—for instance, the adjustable curved shafts.

It is not, of course, essential that the backward bend of the axle or frame be of curved or circular form, for this bend may also be rectangular; but the arc form is preferable.

What I claim is—

1. A trotting-sulky having its main frame or axle curved or bent in a horizontal plane backward behind the axial line of the wheels, forming an open space between the wheels and back of their axis to admit the horse, and having the seat arranged over the axial line and at a position over the rump of the horse, or thereabout, substantially as and for the purpose set forth.

2. A sulky having its frame or axle bowed or bent back of the axis of the wheels, forming a space to admit the horse, and having the whiffletree pivoted to the rear of the frame back of the axis of the wheels, substantially as and for the purpose set forth.

3. A sulky or similar vehicle having its shafts curved at their back ends in a circular curve, or nearly so, and adjustably connected with the frame of the vehicle, whereby the shafts may be adjusted laterally in a circular arc to regulate the spread of the shafts, substantially as herein set forth.

CHAS. F. STILLMAN.

Witnesses:
 CHAS. M. HIGGINS,
 EDWARD H. WALES.